(12) United States Patent
Abu-Jdayil et al.

(10) Patent No.: US 11,359,095 B1
(45) Date of Patent: Jun. 14, 2022

(54) BIODEGRADABLE COMPOSITE INSULATION MATERIAL AND METHOD OF MAKING THE SAME

(71) Applicant: UNITED ARAB EMIRATES UNIVERSITY, Al Ain (AE)

(72) Inventors: Basim Abu-Jdayil, Al Ain (AE);
Waleed Khalil Ahmed, Al Ain (AE);
Amged Elhassan, Al Ain (AE);
Mohsin Raza, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/533,107

(22) Filed: Nov. 22, 2021

(51) Int. Cl.
| | |
|---|---|
| *B29B 13/10* | (2006.01) |
| *C08L 99/00* | (2006.01) |
| *B29B 13/06* | (2006.01) |
| *B29C 43/00* | (2006.01) |
| *E04B 1/78* | (2006.01) |
| *C08J 3/12* | (2006.01) |
| *E04B 1/74* | (2006.01) |
| *B29K 1/00* | (2006.01) |

(52) U.S. Cl.
CPC ............ *C08L 99/00* (2013.01); *B29B 13/06* (2013.01); *B29B 13/10* (2013.01); *B29C 43/003* (2013.01); *C08J 3/12* (2013.01); *E04B 1/78* (2013.01); *B29K 2001/00* (2013.01); *B29K 2995/006* (2013.01); *B29K 2995/0015* (2013.01); *C08J 2399/00* (2013.01); *C08J 2499/00* (2013.01); *C08L 2201/06* (2013.01); *C08L 2205/025* (2013.01); *C08L 2205/16* (2013.01); *E04B 2001/745* (2013.01)

(58) Field of Classification Search
CPC .......... C08L 99/00; C08L 2201/06; C08L 2205/025; C08L 2205/16; B29B 13/06; B29B 13/10; B29C 43/003; C08J 3/12; C08J 2399/00; C08J 2499/00; E04B 1/78; E04B 2001/745; B29K 2001/00; B29K 2995/0015; B29K 2995/006

See application file for complete search history.

(56) References Cited

U.S. PATENT DOCUMENTS

| | | | |
|---|---|---|---|
| 10,655,009 B1 | 5/2020 | Abu-Jdayil et al. | |
| 11,255,052 B1 * | 2/2022 | Abu-Jdayil | ............... D21J 3/00 |

FOREIGN PATENT DOCUMENTS

| | | | |
|---|---|---|---|
| CN | 107495348 | * | 9/2017 |
| CN | 110484080 A | | 11/2019 |
| GB | 2471096 A | | 12/2010 |

OTHER PUBLICATIONS

Khan, Gazi Md et al. "Okra fibers: potential material for green biocomposites." Green biocomposites. Springer, Cham, 2017. 261-284.

* cited by examiner

*Primary Examiner* — Irina S Zemel
(74) *Attorney, Agent, or Firm* — Nath, Goldberg & Meyer; Richard C. Litman

(57) ABSTRACT

The biodegradable composite insulation material is made from date palm leaf fibers and powdered okra. The date palm leaf fibers have a concentration of between 50 wt % and 90 wt % of the biodegradable composite insulation material, and the powdered okra has a concentration of between 10 wt % and 50 wt % of the biodegradable composite insulation material. The biodegradable composite insulation material is prepared by mixing date palm leaf fibers and powdered okra, in the above concentrations, to form a mixture. This mixture is then wetted with water, added to a mold, and heated under pressure to form a compressed article. The compressed article is then dried to form the biodegradable composite insulation material.

13 Claims, 4 Drawing Sheets

BIODEGRADABLE COMPOSITE INSULATION MATERIAL AND METHOD OF MAKING THE SAME

BACKGROUND

1. Field

The disclosure of the present patent application relates to thermal insulation materials, and particularly to a biodegradable, thermally insulating composite made from date palm leaves and okra.

2. Description of the Related Art

Thermal insulators are found in most modern buildings since they significantly reduce the need to artificially heat and cool the interiors of the buildings. Such insulators are traditionally fabricated from petrochemical materials, however, the negative environmental impact of such materials has given rise to an interest in alternative types of insulators. Natural fiber-reinforced polymer composite materials, in particular, are gaining in popularity in a wide variety of industries, including the construction and automotive fields.

A full-scale replacement of petrochemical-based insulators by natural fiber-reinforced polymer composites has not yet taken place because research has shown that the addition of natural fibers to polymer matrices decreases the overall mechanical strength. Developing a composite in which the mechanical strength does not suffer from such a decrease would be of great interest, particularly since natural fibers have numerous advantages over conventional and synthetic fibers, including their environmental friendliness and their ability to create composites with low densities, low costs, and comparable specific strengths.

Although different types of natural fillers, such as the fibers from flax, hemp, jute, kenaf, sisal, abaca, pineapple leaf, ramie, coir, bamboo, rice husk, oil palm, and bagasse have been investigated, fibers from date palm has, thus far, received little attention. It would be desirable to be able to make use of date palms, given how widely they are produced, particularly in Arabian Gulf countries. The United Arab Emirates, for example, has about 40 million date palms. Each palm generates about 15 kilograms of biomass waste annually, largely made up of date wood (DW), where DW typically includes material from the petiole, rachis, leaflets, thorns, spathe, bunch, pedicels, and fibrillium. Accordingly, DW makes up a significant source of waste or low value product at present, and represents a currently underutilized material resource.

Given the abundance of date palm, and the great potential for natural fiber fillers, it would be desirable to be able to use date palm waste in an environmentally friendly alternative to traditional petrochemical-based insulating material, particularly without a loss of mechanical strength in the composite product. Thus, a biodegradable composite insulation material and a method of making the same solving the aforementioned problems are desired.

SUMMARY

The biodegradable composite insulation material is made from date palm leaf fibers and powdered okra. The date palm leaf fibers have a concentration ranging from about 50 wt % to about 90 wt % of the biodegradable composite insulation material, and the powdered okra has a concentration ranging from about 10 wt % to about 50 wt % of the biodegradable composite insulation material. The biodegradable composite insulation material is prepared by mixing date palm leaf fibers and powdered okra, in the above concentrations, to form a mixture. This mixture is then wetted with water, added to a mold, and heated under pressure to form a compressed article. The compressed article is then dried to form the biodegradable composite insulation material.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
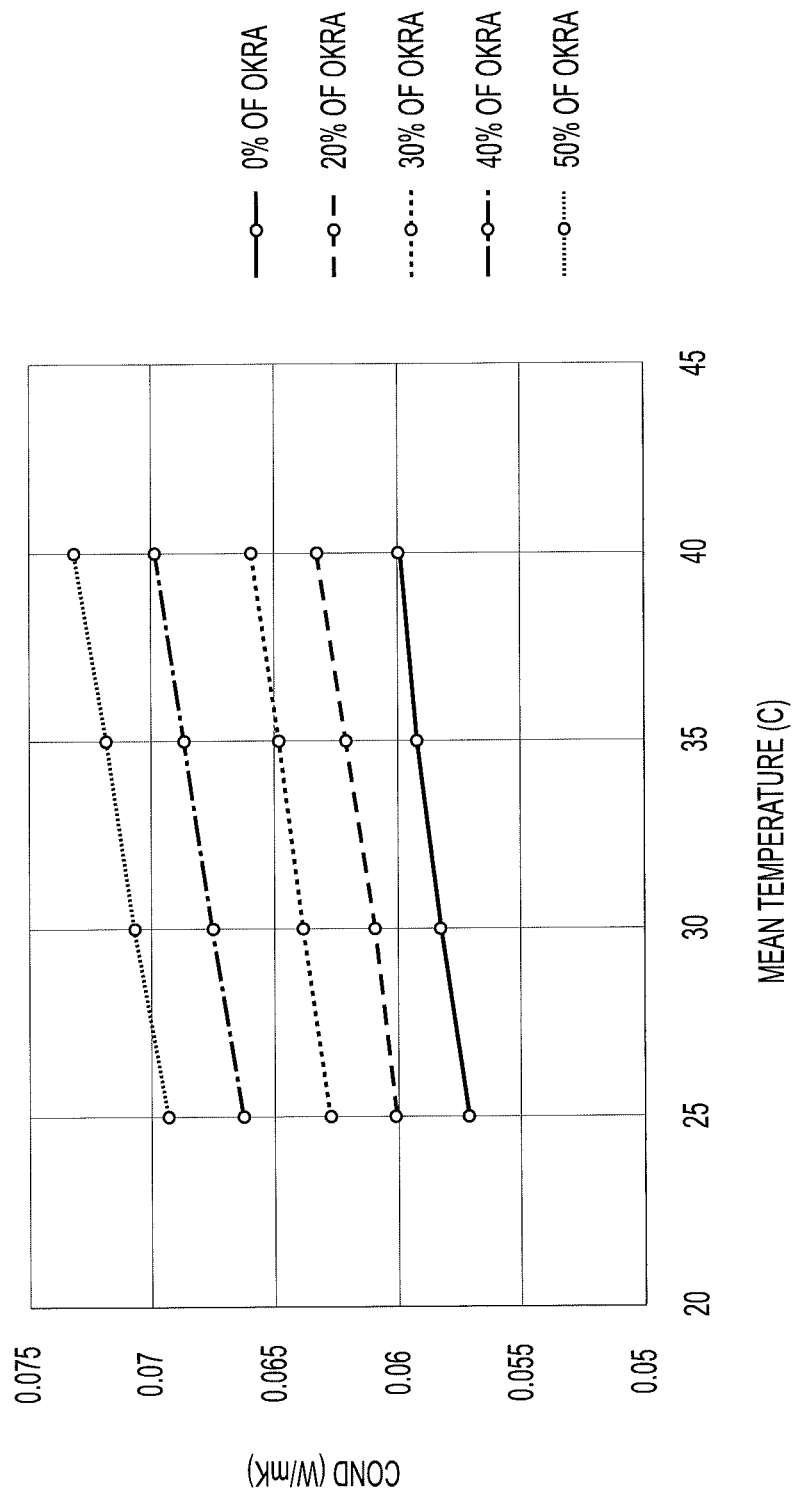
FIG. 1 is a graph showing the measured thermal conductivity for a biodegradable composite insulation material prepared with varying weight ratios of powdered okra to date palm leaf fibers.

The biodegradable composite insulation material is made from date palm leaf fibers and powdered okra. The date palm leaf fibers have a concentration ranging from about 50 wt % to about 90 wt % of the biodegradable composite insulation material, and the powdered okra has a concentration ranging from about 10 wt % to about 50 wt % of the biodegradable composite insulation material. The biodegradable composite insulation material is prepared by mixing date palm leaf fibers and powdered okra, in the above concentrations, to form a mixture. As a non-limiting example, mixing may be performed using a commercial mixer or the like for approximately 1 minute. This mixture is then wetted with water. The wetting may be performed by, for example, gradually spraying pure water over the mixture until it becomes wet. As a non-limiting example, a weight of the sprayed water may range from about 10% to about 20% of the weight of the mixture. As used herein, the term "about" when used to modify a number means within 10% of the modified number.

The wetted mixture is then added to a mold. As a non-limiting example, the wetted mixture may be added to a stainless steel mold. The wetted mixture in the mold is then heated under pressure to form a compressed article. As a non-limiting example, the mixture may be heated in the mold at 80° C. under 250 MPa, using a hot press for approximately 15 minutes. It should be understood that the mold may have any desired shape, such as a cylindrical mold, a flat mold, etc., dependent upon the desired shape of the end product. Additionally, prior to adding the wetted mixture to the mold, it may first be mixed in a bowl at a low speed for, for example, 10 minutes.

The compressed article is then dried to form the biodegradable composite insulation material. As a non-limiting example, the drying may be performed by drying the compressed article, still in the mold, in an air oven at 80° C. for 24 hours. Following drying, the biodegradable composite insulation material may be removed from the oven and left to cool at room temperature.

As a non-limiting example, the initial powdered okra may be prepared by grinding fresh green okra using a grinding machine or the like. The ground okra may then by dried using, for example, spray drying at a temperature between 55° C. and 65° C. for between 10 hours and 12 hours. The dried, ground okra is then filtered to produce the powdered okra. As a non-limiting example, the dried, ground okra may be filtered through an 80 mesh sieve to produce 10:1 soluble okra extracts powder.

As a non-limiting example, the initial date palm leaf fibers may be prepared by peeling the date palm leaves from a date palm tree using a scraper or the like. The date palm leaf fibers may then be cleaned, for example, using dry air and water. The date palm leaf fibers are then soaked in water at a temperature between 110° C. and 125° C. for two hours, and then cleaned with water. As a non-limiting example, drying of the soaked date palm leaf fibers may take place as a two-step process, beginning with drying the soaked date palm leaf fibers at room temperature for one hour, followed by drying the soaked date palm leaf fibers at a temperature of approximately 110° C. for 24 hours. The second drying step may be performed in an air-drying oven or the like. The dried date palm leaf fibers are then ground using a commercial mixer, shredder or the like for two minutes to produce fibers having lengths between approximately 5 mm and 7 mm.

The mechanical properties of biodegradable composite insulation materials produced by the above method are shown below in Table 1 for varying concentrations of the date palm leaf fibers and the okra powder.

TABLE 1

Mechanical Properties of the Biodegradable Composite Insulation Material

| Date palm leaf fibers (wt %) | Powdered okra (wt %) | Ductility (%) | Ultimate (compressive) strength (MPa) | Elastic modulus (MPa) |
|---|---|---|---|---|
| 50 | 50 | 80.00 | 72.49 | 0.81 |
| 60 | 40 | 75.82 | 49.99 | 0.66 |
| 70 | 30 | 69.73 | 30.00 | 0.46 |
| 80 | 20 | 63.93 | 18.81 | 0.30 |

Figure 2:
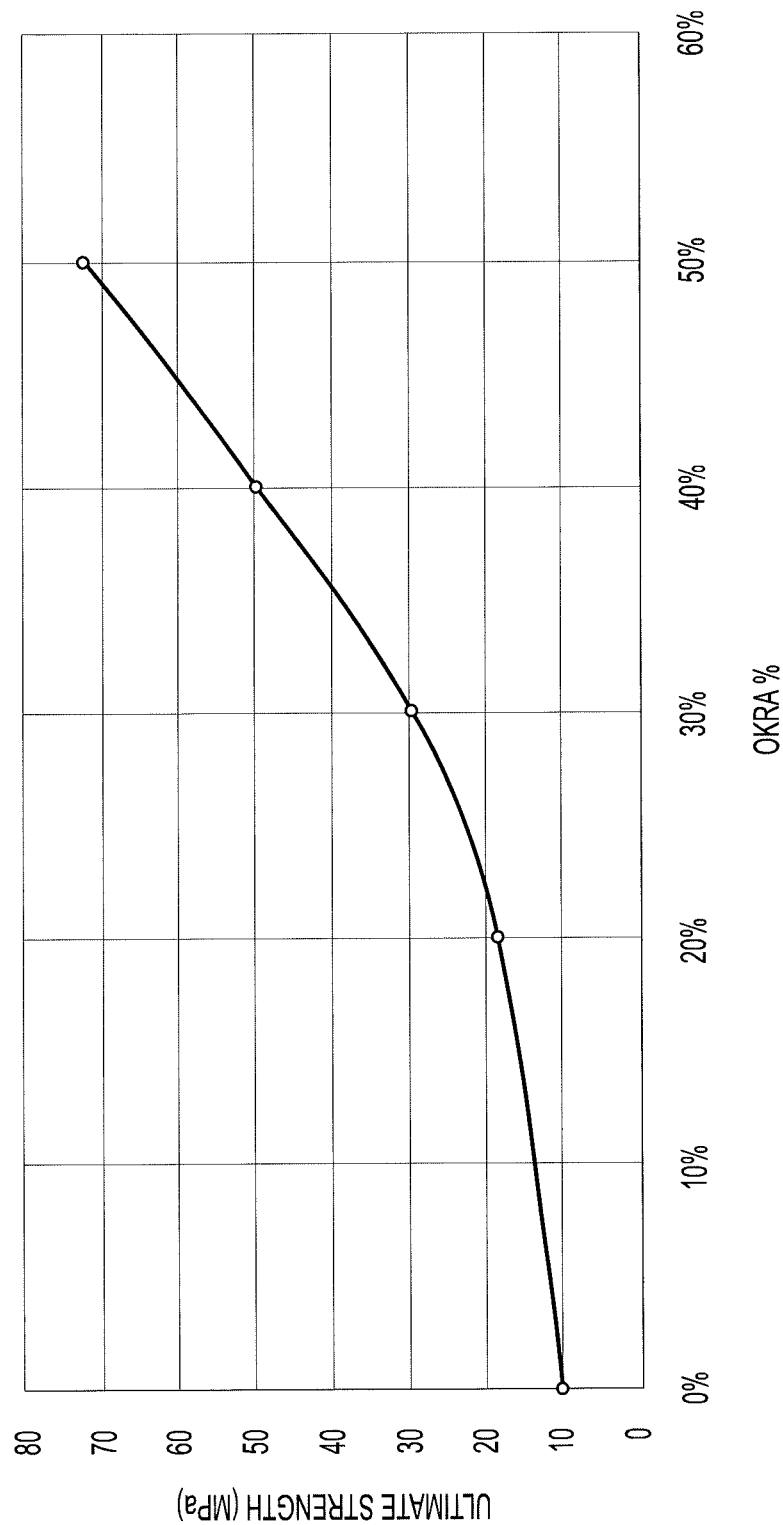
FIG. 2 is a graph showing the measured compressive strength for the biodegradable composite insulation material prepared with varying weight ratios of powdered okra to date palm leaf fibers.

Additionally, the biodegradable composite insulation material is found to have a low thermal conductivity, ranging from about 0.06013 W/m·K to about 0.06938 W/m·K. FIG. 1 shows the thermal conductivity as a function of temperature for the biodegradable composite insulation material with powdered okra concentrations of 0 wt %, 20 wt %, 30 wt %, 40 wt %, and 50 wt % (and corresponding respective date palm leaf fiber concentrations of 100 wt %, 80 wt %, 70 wt %, 60 wt %, and 50 wt %). As can be seen, the measured thermal conductivity is consistently linear for the composite over the varying ratios of powdered okra to date palm leaf fibers. FIG. 2 shows the ultimate (compressive) strength for the composite with powdered okra concentrations of 0 wt %, 20 wt %, 30 wt %, 40 wt %, and 50 wt % (and corresponding respective date palm leaf fiber concentrations of 100 wt %, 80 wt %, 70 wt %, 60 wt %, and 50 wt %). As shown, the compressive strength increases with a corresponding increase of the powered okra concentration (up to 50 wt %). At 50 wt %, the compressive strength is greater than 70 Mpa, which approaches the compressive strength associated with common wood building and insulation materials.

Figure 3:
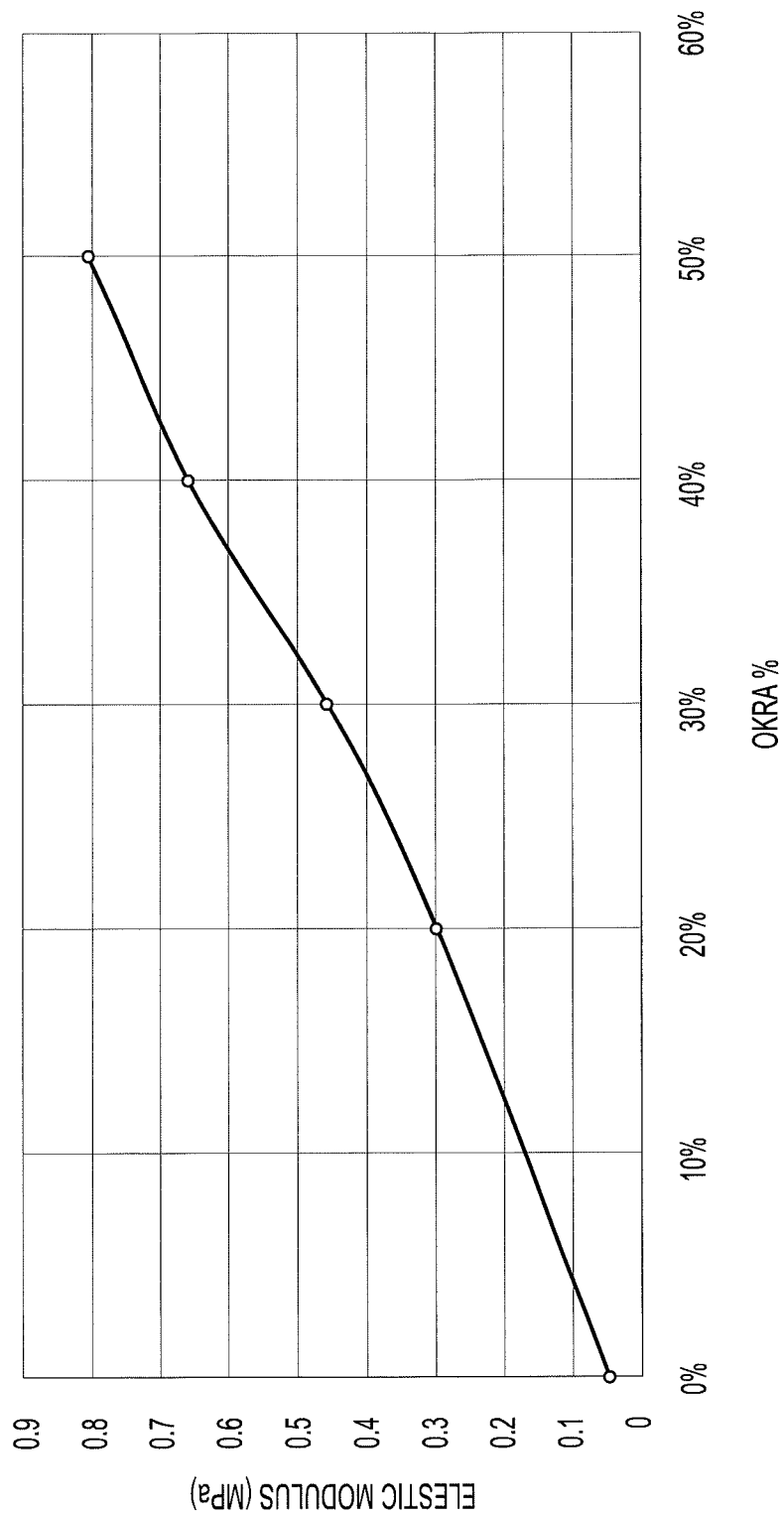
FIG. 3 is a graph showing the measured elastic modulus for the biodegradable composite insulation material prepared with varying weight ratios of powdered okra to date palm leaf fibers.
Figure 4:
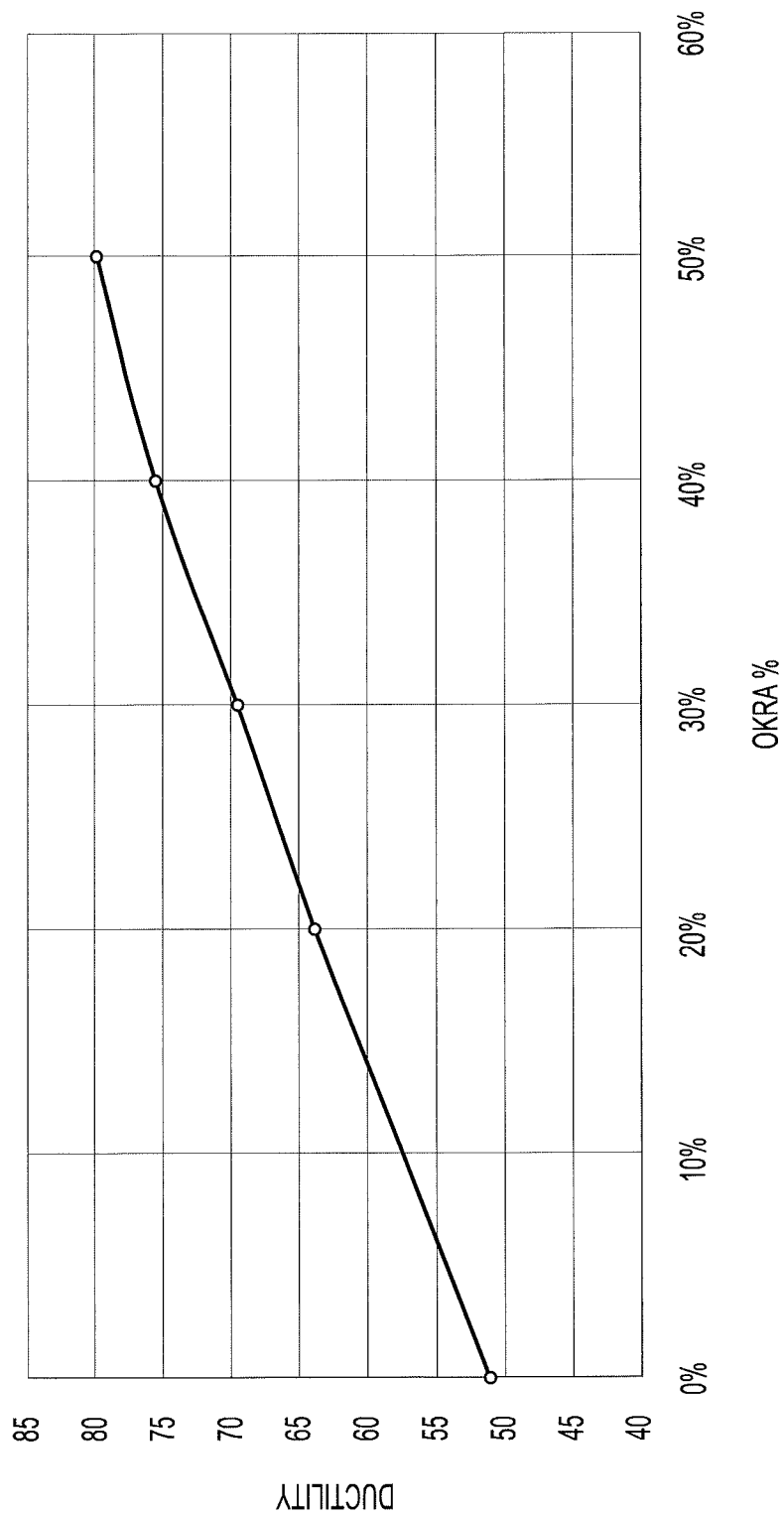
FIG. 4 is a graph showing the measured ductility for the biodegradable composite insulation material prepared with varying weight ratios of powdered okra to date palm leaf fibers.

FIG. 3 shows the measured elastic modulus for the composite with powdered okra concentrations of 0 wt %, 20 wt %, 30 wt %, 40 wt %, and 50 wt % (and corresponding respective date palm leaf fiber concentrations of 100 wt %, 80 wt %, 70 wt %, 60 wt %, and 50 wt %). As shown, the elastic modulus has a substantially linear behavior, with an elastic modulus range within those associated with commercially available polymeric insulating materials. FIG. 4 shows the measured ductility for the composite with powdered okra concentrations of 0 wt %, 20 wt %, 30 wt %, 40 wt %, and 50 wt % (and corresponding respective date palm leaf fiber concentrations of 100 wt %, 80 wt %, 70 wt %, 60 wt %, and 50 wt %). As shown, the ductility is substantially linear, approaching 80% at a powdered okra concentration of 50 wt %.

It is to be understood that the biodegradable composite insulation material and method of making the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A biodegradable composite insulation material, comprising:
   date palm leaf fibers having a concentration ranging from about 50 wt % to about 90 wt % of the biodegradable composite insulation material; and
   powdered okra having a concentration ranging from about 10 wt % to about 50 wt % of the biodegradable composite insulation material.

2. A method of making a biodegradable composite insulation material, comprising the steps of:
   mixing date palm leaf fibers and powdered okra to form a mixture, wherein the date palm leaf fibers have a concentration ranging from about 50 wt % to about 90 wt % of the mixture, and the powdered okra has a concentration ranging from about 10 wt % to about 50 wt % of the mixture;
   wetting the mixture with water;
   adding the mixture to a mold;
   heating the mixture under pressure in the mold to form a compressed article;
   drying the compressed article to form the biodegradable composite insulation material.

3. The method of making a biodegradable composite insulation material as recited in claim 2, wherein a weight of the water in the step of wetting the mixture ranges from about 10% to about 20% of a weight of the mixture.

4. The method of making a biodegradable composite insulation material as recited in claim 2, wherein the step of heating the mixture under pressure in the mold comprises heating the mixture at a temperature of about 80° C. under about 250 MPa.

5. The method of making a biodegradable composite insulation material as recited in claim 4, wherein the step of heating the mixture under pressure in the mold comprises heating the mixture under pressure in the mold for about 15 minutes.

6. The method of making a biodegradable composite insulation material as recited in claim 2, further comprising the step of mixing the mixture for about 10 minutes following the step of wetting the mixture and prior to the step of adding the mixture to the mold.

7. The method of making a biodegradable composite insulation material as recited in claim 2, wherein the step of drying the compressed article comprises drying the compressed article in the mold within an oven.

8. The method of making a biodegradable composite insulation material as recited in claim 7, wherein the step of drying the compressed article comprises drying the compressed article at about 80° C. for about 24 hours.

9. The method of making a biodegradable composite insulation material as recited in claim 2, further comprising the steps of:
    grinding fresh green okra;
    drying the ground okra; and
    filtering the dried, ground okra to produce the powdered okra.

10. The method of making a biodegradable composite insulation material as recited in claim 9, wherein the step of drying the ground okra comprises spray drying the ground okra at a temperature ranging from about 55° C. to about 65° C. for about 10 hours to about 12 hours.

11. The method of making a biodegradable composite insulation material as recited in claim 10, wherein the step of filtering the dried, ground okra comprises filtering the dried, ground okra through an 80 mesh sieve.

12. The method of making a biodegradable composite insulation material as recited in claim 2, wherein, prior to the step of mixing the date palm leaf fibers and the powdered okra to form the mixture, the method further comprises:
    cleaning the date palm leaf fibers;
    soaking the date palm leaf fibers in water at a temperature ranging from about 110° C. to about 125° C. for about two hours;
    drying the soaked date palm leaf fibers; and
    grinding the dried date palm leaf fibers.

13. The method of making a biodegradable composite insulation material as recited in claim 12, wherein the step of drying the soaked date palm leaf fibers comprises:
    drying the soaked date palm leaf fibers at room temperature for one hour; and
    drying the soaked date palm leaf fibers at a temperature of approximately 110° C. for 24 hours.

\* \* \* \* \*